United States Patent
Tesier

(10) Patent No.: US 11,307,680 B2
(45) Date of Patent: Apr. 19, 2022

(54) COMPUTER MOUSE ADAPTER AND ASSOCIATED METHODS

(71) Applicant: Smash Engineering Inc., Kissimmee, FL (US)

(72) Inventor: Peter Tesier, Kissimmee, FL (US)

(73) Assignee: SMASH ENGINEERING INC., Kissimmee, FL (US)

(*) Notice: Subject to any disclaimer, the term of this patent is extended or adjusted under 35 U.S.C. 154(b) by 0 days.

(21) Appl. No.: 17/173,820

(22) Filed: Feb. 11, 2021

(65) Prior Publication Data

US 2021/0247855 A1  Aug. 12, 2021

Related U.S. Application Data

(60) Provisional application No. 63/073,375, filed on Sep. 1, 2020, provisional application No. 63/062,897, filed on Aug. 7, 2020, provisional application No. 62/995,749, filed on Feb. 12, 2020.

(51) Int. Cl.
*G06F 3/0354* (2013.01)
*H02J 50/10* (2016.01)
*G06F 3/039* (2013.01)

(52) U.S. Cl.
CPC .......... *G06F 3/03543* (2013.01); *G06F 3/039* (2013.01); *H02J 50/10* (2016.02); *G06F 2203/0333* (2013.01)

(58) Field of Classification Search
CPC ................. G06F 3/03543; G06F 3/039; G06F 2203/0333; H02J 50/10
See application file for complete search history.

(56) References Cited

U.S. PATENT DOCUMENTS

| 7,732,752 B2 | 6/2010 | Mathis et al. | |
| 9,798,387 B2 | 10/2017 | Joseph et al. | |
| 2005/0062717 A1* | 3/2005 | Willat | G06F 3/03543 345/163 |
| 2005/0110760 A1 | 5/2005 | Huang et al. | |
| 2006/0044270 A1* | 3/2006 | Chen | G06F 3/03543 345/163 |

(Continued)

FOREIGN PATENT DOCUMENTS

| CN | 208766618 | * 4/2019 | .......... G06F 3/0354 |
| WO | 2008148043 A2 | 12/2008 | |

OTHER PUBLICATIONS

Written Opinion of the International Searching Authority in related application PCT/US2021/017778 dated May 27, 2021; 8 pages.

(Continued)

*Primary Examiner* — Ariel A Balaoing
(74) *Attorney, Agent, or Firm* — Mark Malek; Paul Ditmyer; Widerman Malek, PL

(57) ABSTRACT

The computer mouse adaptor holds a computer mouse thereon. The computer mouse includes an optical system to detect relative movement over a surface. The computer mouse adaptor includes a base to hold the computer mouse thereon. The base includes an optical device to interface with the optical system of the computer mouse and allow the computer mouse to provide its functionality while being held by the base. A charging system may be included to couple the charging interface of the computer mouse to a power source.

8 Claims, 11 Drawing Sheets

(56) References Cited

U.S. PATENT DOCUMENTS

| | | | |
|---|---|---|---|
| 2006/0114232 A1* | 6/2006 | Choi | G06F 3/0317 345/166 |
| 2006/0131487 A1* | 6/2006 | Mathis | G06F 3/0317 250/221 |
| 2006/0176277 A1* | 8/2006 | Daniel | G06F 3/0317 345/163 |
| 2008/0002340 A1* | 1/2008 | Chatterjee | G06F 1/1632 361/679.1 |
| 2009/0213077 A1* | 8/2009 | Bailen | G06F 3/038 345/164 |
| 2011/0063219 A1* | 3/2011 | Min-Liang | G06F 3/03543 345/163 |
| 2017/0205879 A1* | 7/2017 | Joseph | G06F 3/03544 |
| 2019/0005702 A1* | 1/2019 | Takimoto | G06T 15/005 |
| 2020/0118511 A1* | 4/2020 | Chen | G09G 3/3648 |

OTHER PUBLICATIONS

International Search Report in related application PCT/US2021/017778 dated Jun. 1, 2021; 4 pages.

\* cited by examiner

COMPUTER MOUSE ADAPTER AND ASSOCIATED METHODS

RELATED APPLICATIONS

This application claims priority to U.S. Provisional Applications Ser. No. 62/995,749 filed Feb. 12, 2020 titled "DEVICE FOR ENHANCING A MOUSE", Ser. No. 63/062,897 filed Aug. 7, 2020 titled "DEVICE FOR ENHANCING A COMPUTER MOUSE", Ser. No. 63/073,375 filed Sep. 1, 2020 titled "DEVICE FOR IMPROVING A COMPUTER MOUSE," each of which are incorporated herein by reference in their entireties.

FIELD OF THE INVENTION

The present invention is related to the field of computer input devices. More specifically, it is an attachment to a computer mouse.

BACKGROUND OF THE INVENTION

Some computer mice are too thin and/or not ergonomic, causing discomfort in the user's hand. In addition, some wireless mice contain an internal battery which is charged from time-to-time with an external cable, and they may have their charging port on the underside, making them difficult to charge.

Therefore, it would be desirable then to provide a device which would address the many shortcomings of the present conventional approaches.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, one of the many objects of the present invention is to provide an adaptor for a computer mouse to improve ergonomics and/or making charging more convenient.

An embodiment of the present invention provides a computer mouse adaptor to hold a computer mouse, the computer mouse including an optical system to detect relative movement over a surface. The computer mouse adaptor includes a base to hold the computer mouse thereon. The base includes an optical device to interface with the optical system of the computer mouse and allow the computer mouse to provide its functionality while being held by the base.

The optical system of the computer mouse may include a light source and a light sensor. The computer mouse may further include a charging interface. The optical device of the base may include one or more optical lenses aligned with the optical sensor while the computer mouse is held by the base.

The optical device of the base may include one or more optical lenses aligned with the light source while the computer mouse is held by the base. In some embodiments, the optical device of the base may include one or more mirrors aligned to reflect light from the light source to the surface which then reflects to the light sensor while the computer mouse is held by the base. In other embodiments, a plurality of mirrors may be aligned to reflect light from the light source to the surface while the computer mouse is held by the base. In still other embodiments, the plurality of mirrors may be aligned to reflect light, from the light source via the surface, to the light sensor while the computer mouse is held by the base.

The base may include a charging system to pair or couple the charging interface of the computer mouse to a power source (e.g., an external power source). Also, the charging interface of the mouse may be a wireless charging interface, and the charging system may then be a wireless charging system.

Another embodiment of the present invention provides a computer mouse adaptor to hold a computer mouse that includes a charging interface, and an optical system having a light source and a light sensor to detect relative movement over a surface. The computer mouse adaptor may include a base to hold the computer mouse thereon. The base may include an optical lens aligned with the optical system of the computer mouse while the computer mouse is held by the base to interface with the optical system and allow the computer mouse to provide its functionality while being held by the base. The base may also include a charging system to couple the charging interface of the computer mouse to a power source.

The optical lens may be aligned with the light source of the optical system while the computer mouse is held by the base. Alternatively, the optical lens may be aligned with the light sensor of the optical system while the computer mouse is held by the base.

In some implementations, the charging system of the base may comprise a charging connector on a top surface of the base to connect to the charging interface of the computer mouse, and a base charging port on the base, coupled to the charging connector, for connection to the power source.

Another embodiment of the present invention provides a computer mouse adaptor to hold a computer mouse that includes a charging interface, and an optical system having a light source and a light sensor to detect relative movement over a surface. The computer mouse adaptor may include a base to hold the computer mouse thereon. The base may include a mirror aligned with the optical system of the computer mouse while the computer mouse is held by the base to interface with the optical system and allow the computer mouse to provide its functionality while being held by the base. The base may also include a charging system to couple the charging interface of the computer mouse to a power source.

DETAILED DESCRIPTION OF THE INVENTION

Figure 1:
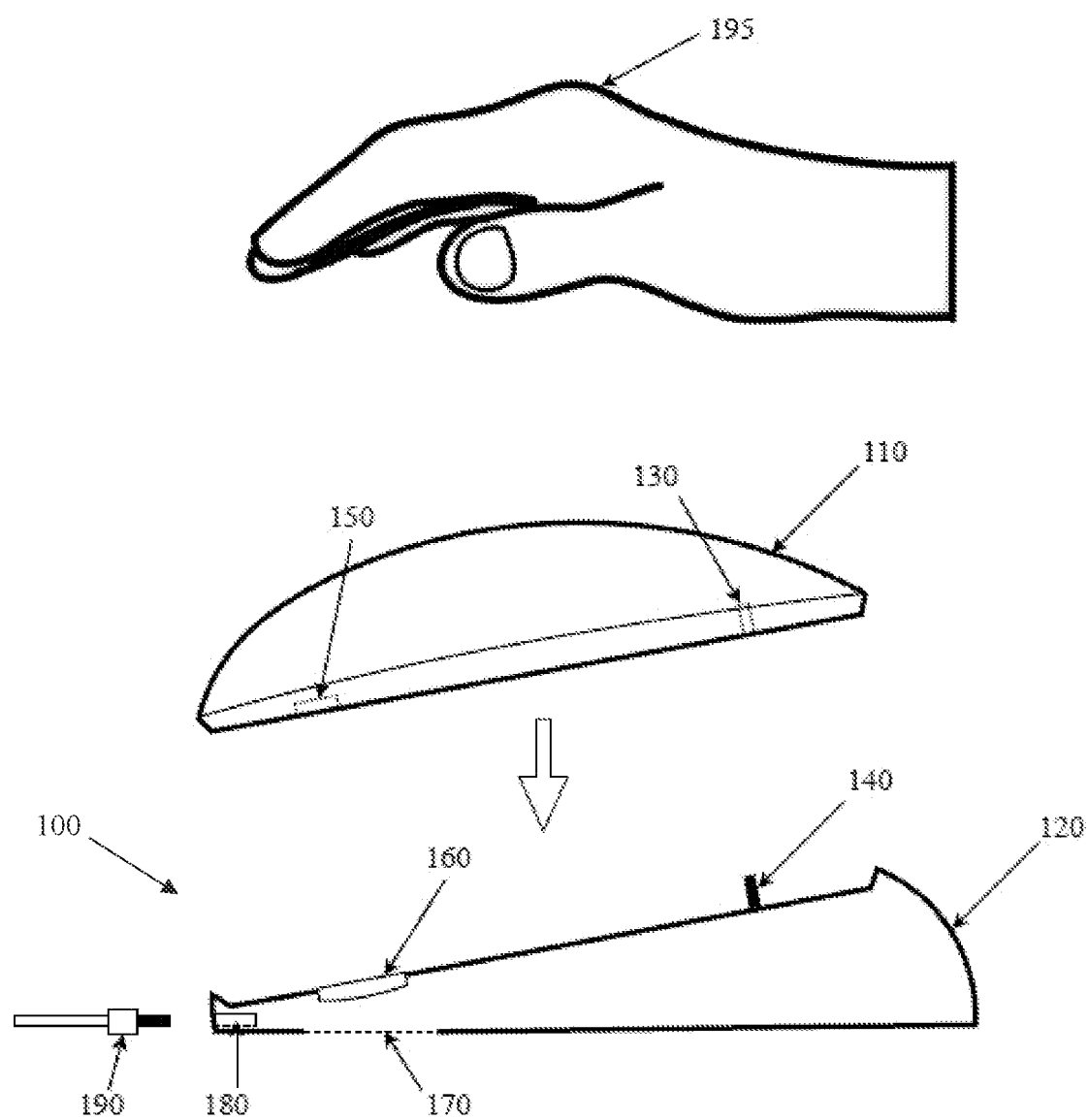
FIG. 1 is a schematic side view illustration of an embodiment of the computer mouse adaptor according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While several methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within the embodiment. In addition, reference to a specific benefit, advantage, problem, solution, method of use, etc. in relation to one embodiment should not be construed as being limited to applications only within the embodiment.

The headings used herein are for organizational purposes only and are not meant to be used to limit the scope of the description or the claims. To facilitate understanding, like reference numerals have been used, where possible, to designate like elements common to the figures.

Embodiments of the invention, as shown and described by the various figures and accompanying text, provide a computer mouse adaptor that alleviates discomfort in the user's hand from using a computer mouse that is too thin and/or not ergonomic. In addition, various embodiments make it possible to use the computer mouse and adaptor during charging.

Figure 2:
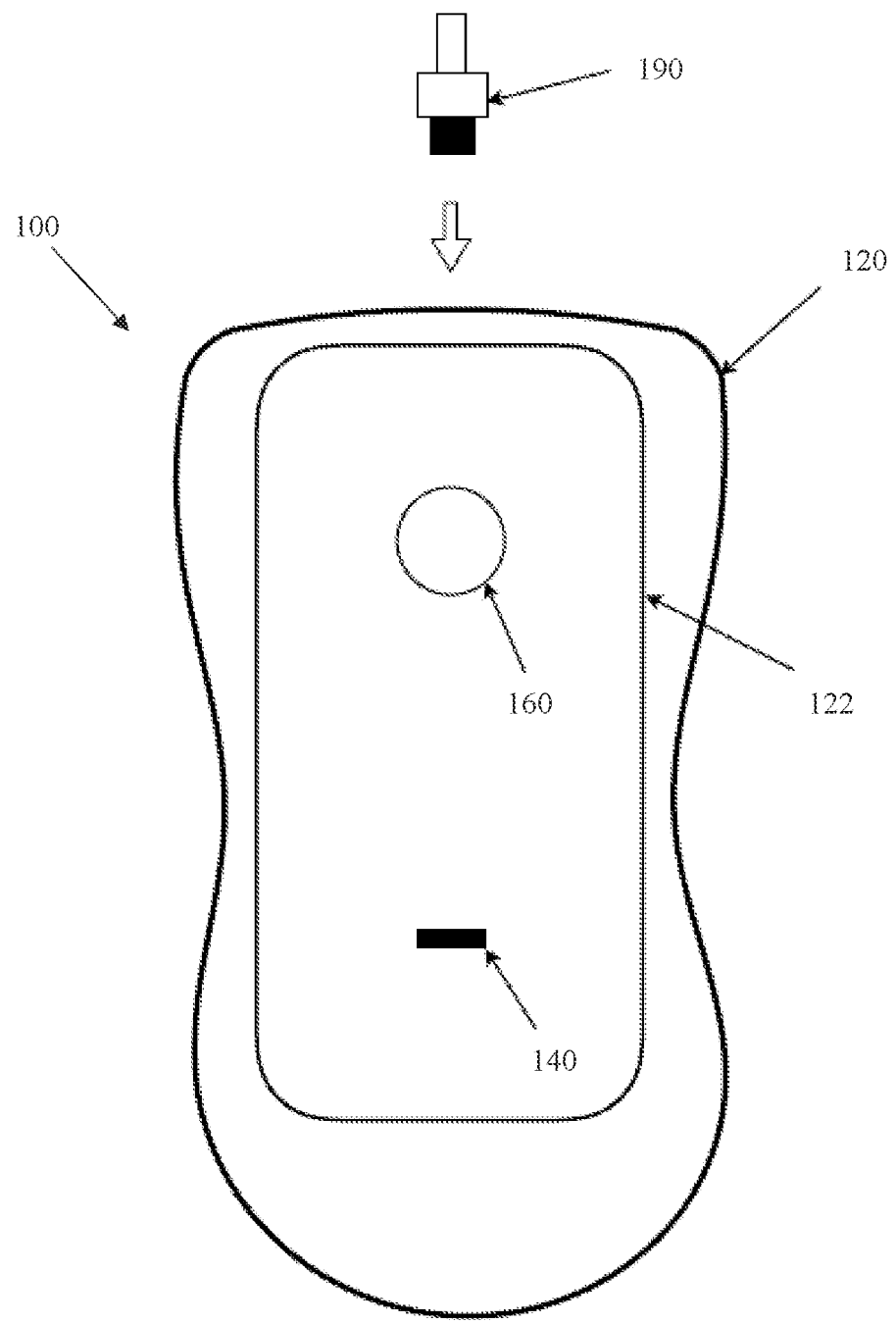
FIG. 2 is a schematic top view illustration of the embodiment of FIG. 1.
Figure 3:
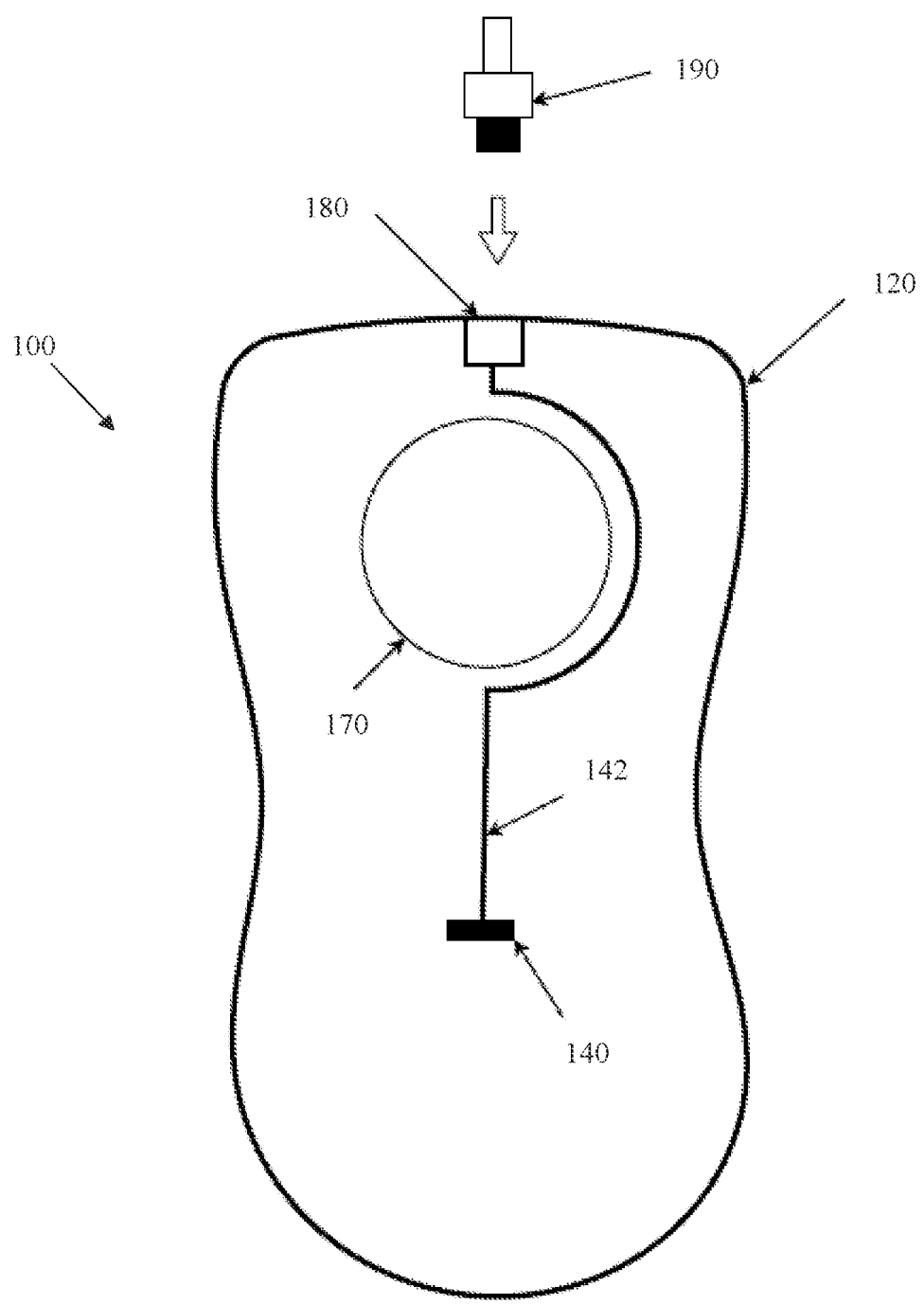
FIG. 3 is a schematic internal view illustration of the embodiment of FIG. 1.

FIGS. 1-3 illustrate features of a computer mouse adaptor 100 of an embodiment of the invention. FIG. 1 is a schematic side view illustration of the computer mouse adaptor 100 in its environment. FIG. 2 is a schematic top view illustration and FIG. 3 is a schematic internal view illustration.

FIG. 1 illustrates a cross-section of a base 120 of the computer mouse adaptor 100, as seen from the side. In this embodiment, a wireless optical mouse 110 connects to the top of base 120. Mouse 110 has an underside charging port 130, which aligns with and connects to a charging connector 140 on base 120. Charging connector 140 is electrically coupled to charging port 180 inside the base 120 (FIG. 3). Thus, a charging cable 190 can be plugged into charging port 180 to charge mouse 110 via charging connector 140 and mouse charging port 130. Mouse 110 also has an underside optical system 150, which aligns with a lens 160 (or other optical device) on base 120. The optical system 150 includes both a light source and a light sensor, as will be discussed in further detail below.

Base 120 includes a window (e.g., an opening or hole) 170 on its underside, positioned directly underneath the lens 160. Lens 160 may be concave and bends the light coming in and out of optical system 150 such that it goes through window 170. This feature allows mouse 110 to act as if it were lying flat on the surface that is under window 170. This feature also allows the base 120 and mouse 110 combination to be dragged around and used as a single or integrated mouse pointer. A user can use the base 120 and mouse 110 combination by placing a hand 195 on top, as would be appreciated by those skilled in the art.

FIG. 2 illustrates an embodiment of the base 120, as seen from the top. The base 120 includes a groove 122, the charging connector 140, and the optical device or lens 160. Groove 122 is designed to fit and hold the underside of the wireless optical mouse. Charging connector 140 plugs into the charging port 130 of the mouse. Lens 160 aligns with the optical system 150 of the mouse 110. A charging cable 190 can be plugged into a charging port on the side of base 120 in order to charge the mouse 110.

FIG. 3 illustrates a cross-section of the inside of an embodiment of the base 120, as seen from above. The base 120 includes the window 170, the charging connector 140, the electrical connection 142, and the charging port 180. The window 170 is positioned directly underneath the optical system 150 of the mouse 110 (not shown here) and allows light to travel in and out of the lens 160 and onto the surface directly under base 120. Charging connector 140 connects to the mouse 110 above and is coupled to electrical connection 142. Electrical connection 142 runs to charging port 180, which may be positioned on the side of base 120. A charging cable 190 can be plugged into charging port 180 in order to charge the mouse 110.

In certain implementations, the mouse 110 may be charged while being held by the base 120 without having to flip the mouse 110 over and/or without having to remove it from the base 120. The mouse 110 may be operated by a user while being held by the base 120 and being charged. Alternatively, in accordance with some mouse designs, the mouse 110 may shut off or be in a sleep mode while being charged via base 120 and charging port 180. Furthermore, wireless charging is also contemplated herein. In certain implementations, the mouse 110 may include a wireless charging interface instead of, or in addition to, a wired charging interface or charging port 130. As such, the base 120 may include a wireless charging device instead of, or in addition to, wired charging connector 140. Additionally, the base 120 may also include a wireless charging interface instead of, or in addition to, wired charging interface or port 180.

Figure 4:
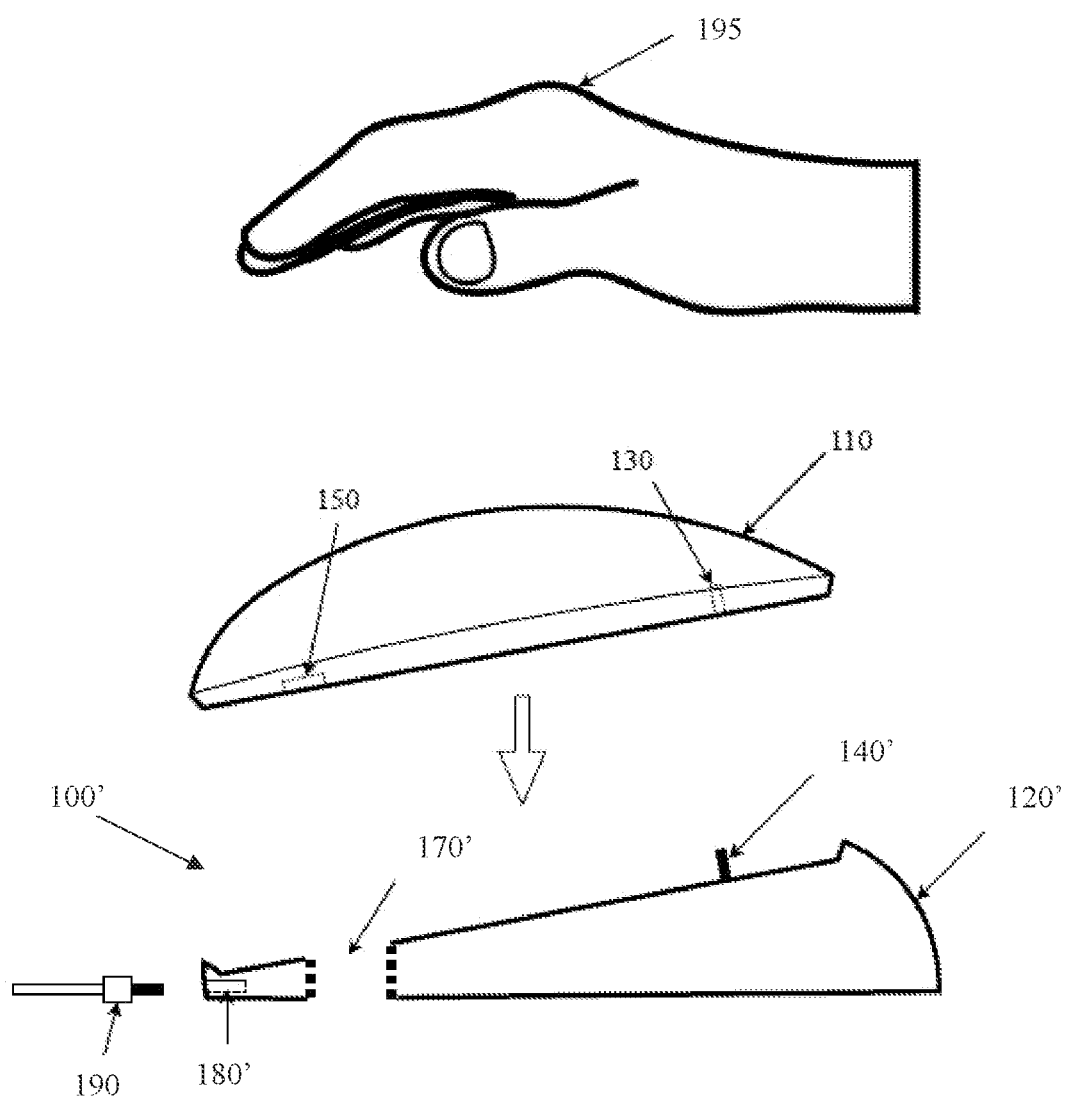
FIG. 4 is a schematic side view illustration of another embodiment of the computer mouse adaptor according to the present invention.
Figure 5:
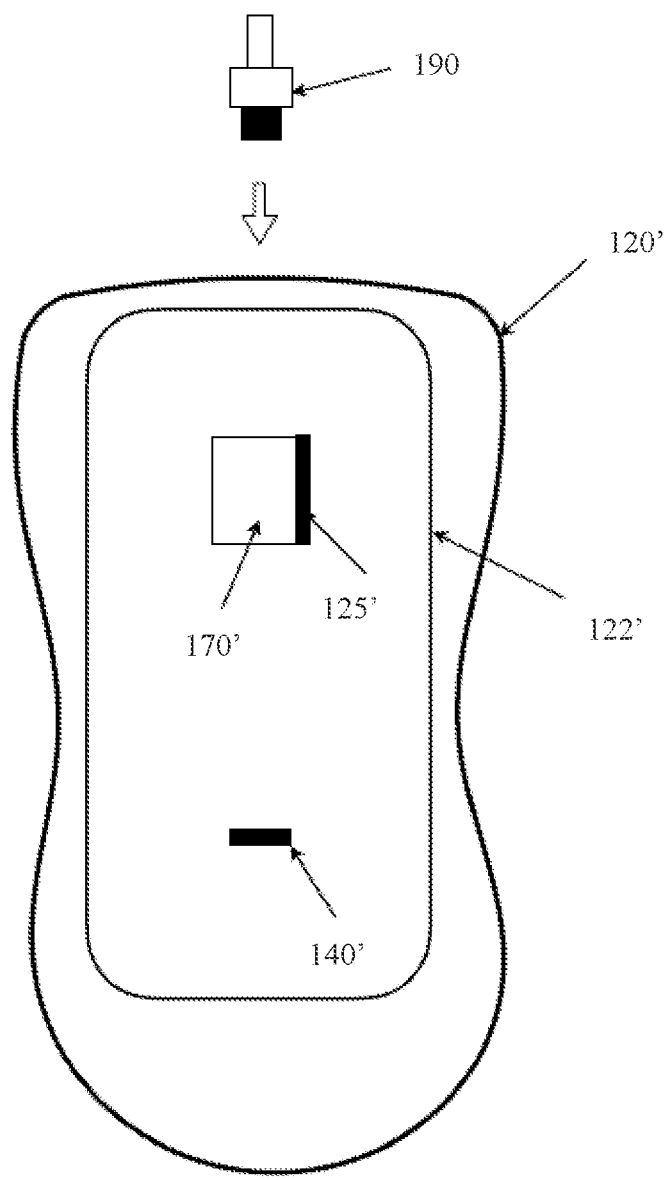
FIG. 5 is a schematic top view illustration of the embodiment of FIG. 4.

FIG. 4 illustrates a cross-section view of an embodiment of the computer mouse adaptor 100' in its environment, as seen from the side. The computer mouse adaptor 100' includes a base 120', a charging connector 140', a window 170', and a charging port 180'. In this embodiment, a wireless optical/laser mouse 110 connects to the top of base 120'. Mouse 110 has an underside charging port 130, which aligns with and connects to charging connector 140' on base 120'. Charging connector 140' is connected to charging port 180' with an electrical connection inside base 120' (not shown here). Thus, a charging cable 190 can be plugged into charging port 180' to charge mouse 110. Mouse 110 also has an underside optical system 150, which aligns with a window 170' on base 120'. Optical system 150 includes a light source and light sensor (not shown here), Window 170' may include a mirror, e.g., on its side (not shown), which allows optical system 150 to function as if mouse 110 was lying flat on the surface that is under the window 170. This feature also allows the base 120' and mouse 110 combination to be dragged around and used like a single-piece mouse. The user can use the base 120' and mouse 110 combination by placing a hand 195 on top as would be appreciated by those skilled in the art FIG. 5 illustrates the base 120' of the computer mouse adaptor 100', as seen from the top. The base 120', a groove 122', charging connector 140', window 170', and a mirror 125' are shown. Groove 122' fits and holds the underside of a wireless optical/laser mouse (not shown here). Charging connector 140' plugs into the charging port of the mouse as discussed above. Window 170' aligns with the optical system of the mouse and exposes the surface under base 120' to such optical system. Mirror 125' is positioned on the side of window 170', for example. A charging cable 190 can be plugged into a charging port on the side of base 120' in order to charge the mouse.

Figure 6:
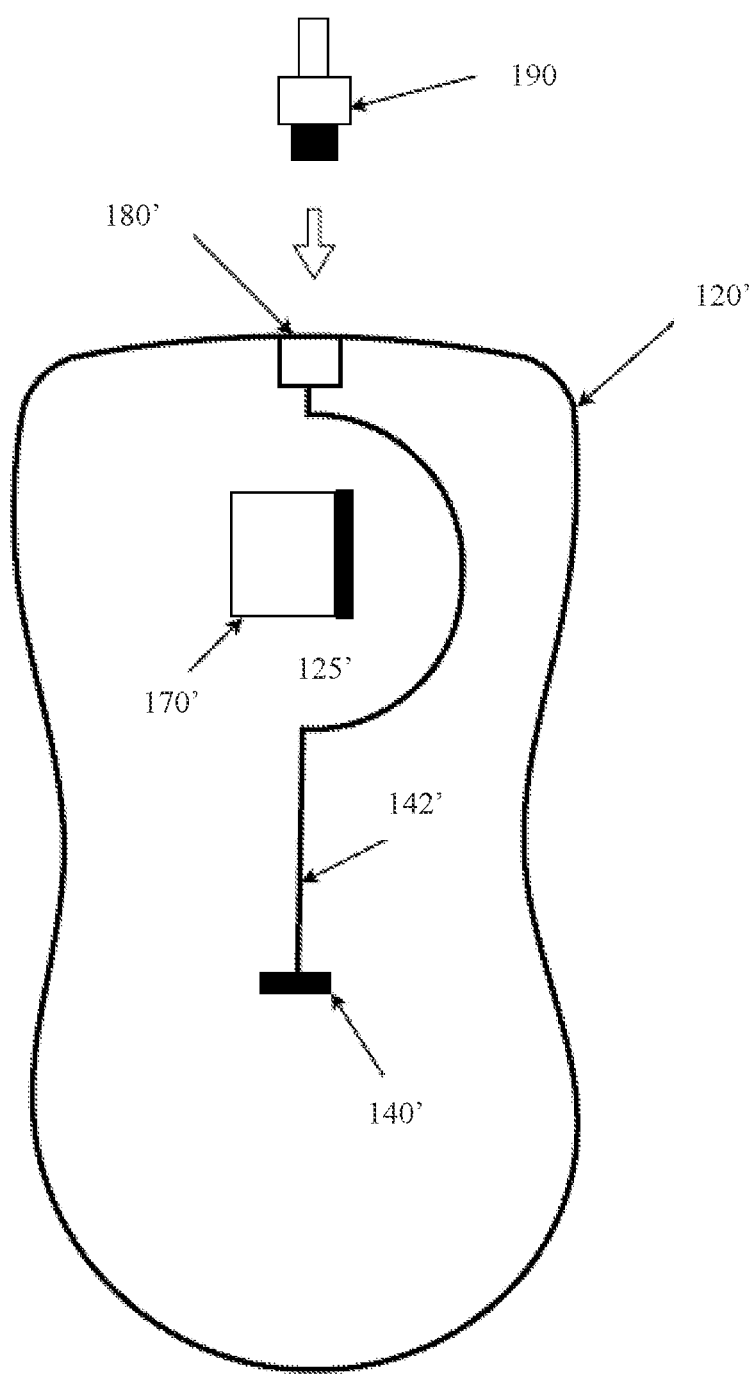
FIG. 6 is a schematic internal view illustration of the embodiment of FIG. 4.

FIG. 6 illustrates a cross-sectional view of the inside of the computer mouse adaptor 100', as seen from above. The adaptor 100' includes base 120', window 170', charging connector 140', an electrical connection 142', and charging port 180'. Window 170' aligns with the optical system of a wireless optical/laser mouse (not shown here). Charging connector 140' connects to the mouse and is connected to electrical connection 142' which runs to charging port 180' and may be positioned on the side of base 120' so that the mouse and adaptor 100' can be used even while charging. A charging cable 190 can be plugged into charging port 180' in order to charge the mouse.

Figure 7:
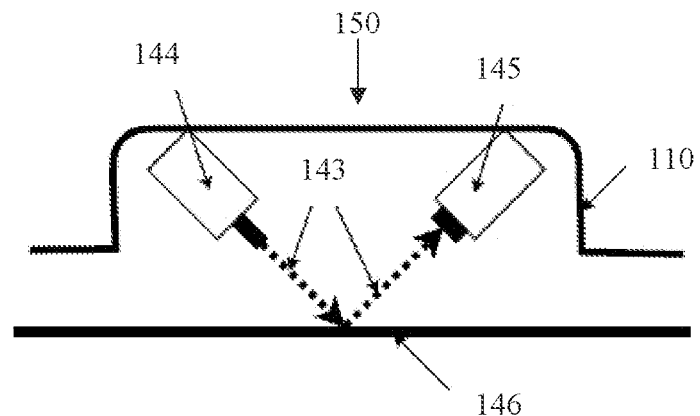
FIG. 7 is a schematic internal view illustration of a portion of a computer mouse for use with the computer mouse adaptor of FIG. 4.

FIG. 7 illustrates a cross-sectional view of a part of the mouse 110, notably the optical system 150, without the adaptor of the present embodiment, and as seen from the side. The underside of the mouse 110 is shown. The optical system 150 of the mouse 110 includes a light source 144 and a light sensor 145. Light source 144 emits a light beam 143. Light beam 143 may be a laser light, LED light, or other type of light as would be appreciated by those skilled in the art. Light beam 143 hits a surface 146, and gets reflected into sensor 145. Mouse 110 uses the images captured by sensor 145 to calculate the direction that the mouse 110 is moving.

Figure 8:
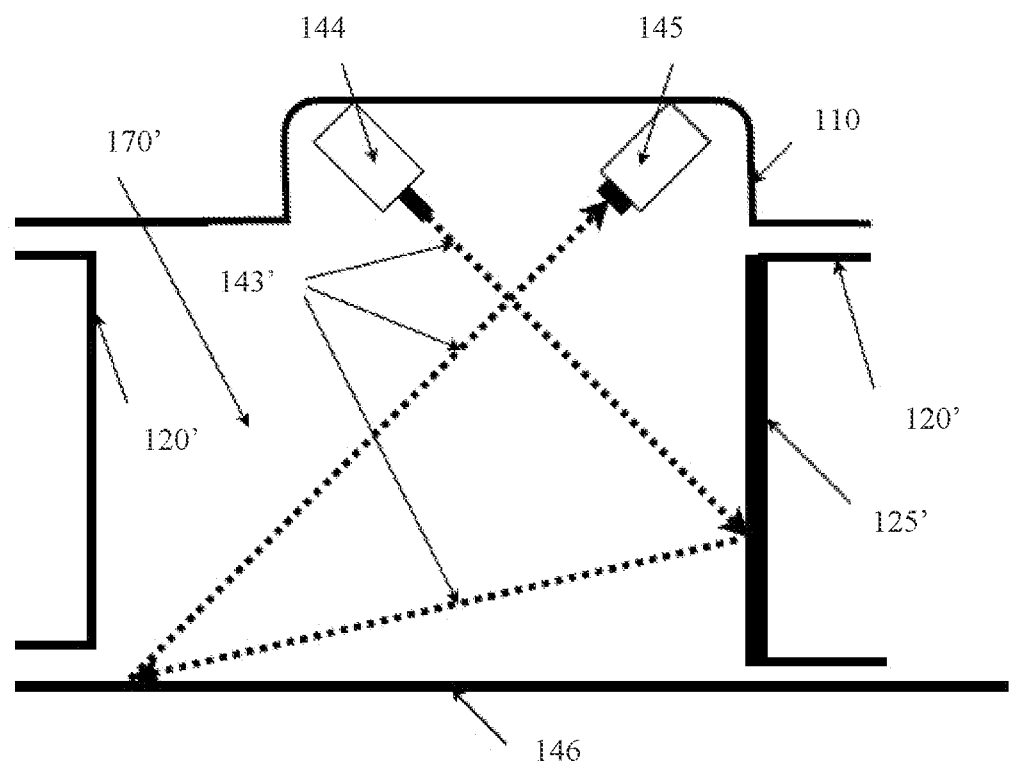
FIG. 8 is a schematic internal view illustration of the computer mouse of FIG. 7 being used with the computer mouse adaptor of FIG. 4.

FIG. 8 illustrates a cross-sectional view of a portion of the inside of an embodiment of the computer mouse adaptor 100' holding a mouse 110, as seen from the side. The underside of the mouse 110 is shown. Mouse 110 includes the optical system 150 having a light source 144 and a light sensor 145. The base 120' of the adaptor 100' attaches to the bottom of mouse 110. Base 120' includes window 170', which exposes a surface 146 to mouse 110. The mirror 125' may be positioned on the side of window 170'. Light source 144 emits a light beam 143' that may be a laser light, LED light, or other type of light as discussed above. Light beam 143' gets reflected by mirror 125' and hits surface 146, and then gets reflected into light sensor 145 via the window 170'.

Figure 9:
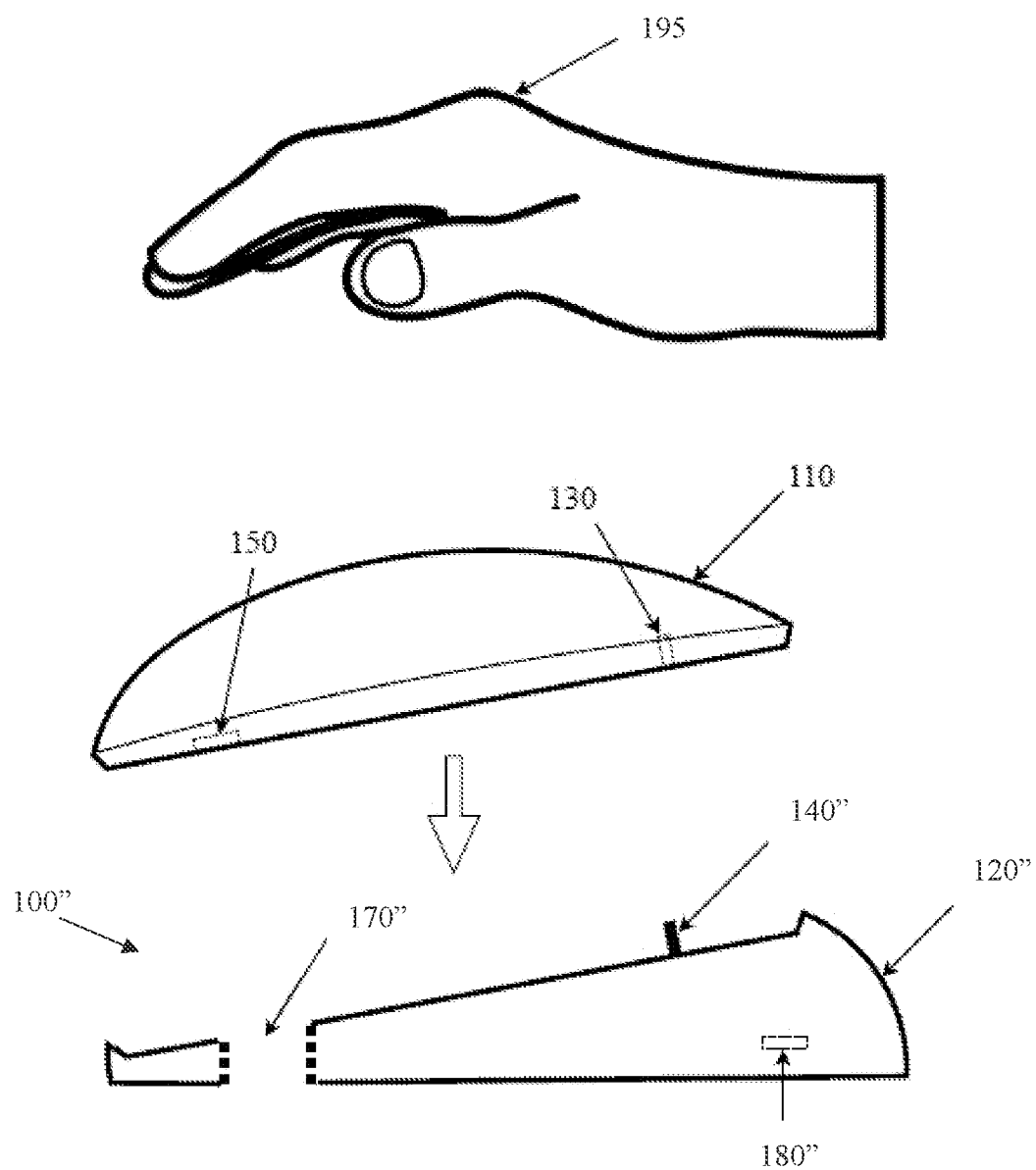
FIG. 9 is a schematic side view illustration of another embodiment of the computer mouse adaptor according to the present invention.

FIG. 9 illustrates a cross-sectional view of an embodiment of computer mouse adaptor 100" in its environment, as seen from the side. The adaptor 100" includes a base 120", a charging connector 140", a window 170", and a charging port 180". In this embodiment, an optical or laser mouse 110 connects to the top of base 120". Mouse 110 has an underside charging port 130, which aligns with and connects to charging connector 140". Charging connector 140" is connected to charging port 180 with an electrical connection (not shown here) inside base 120". Thus, a charging cable can be plugged into charging port 180" to charge mouse 110. Mouse 110 also has an underside optical system 150, which aligns with window 170" in base 120". Optical system 150 includes a light source and light sensor (not shown here). Window 170" may include two mirrors on its sides (not shown), which allows optical system 150 to function as if mouse 110 was lying flat on the surface that is under window 170". This feature also allows the base 120" and mouse 110 combination to be dragged around and used like a single-piece mouse. To use the mouse 110, a user can place a hand 195 on top of the adaptor 100" and mouse 110 combination.

Figure 10:
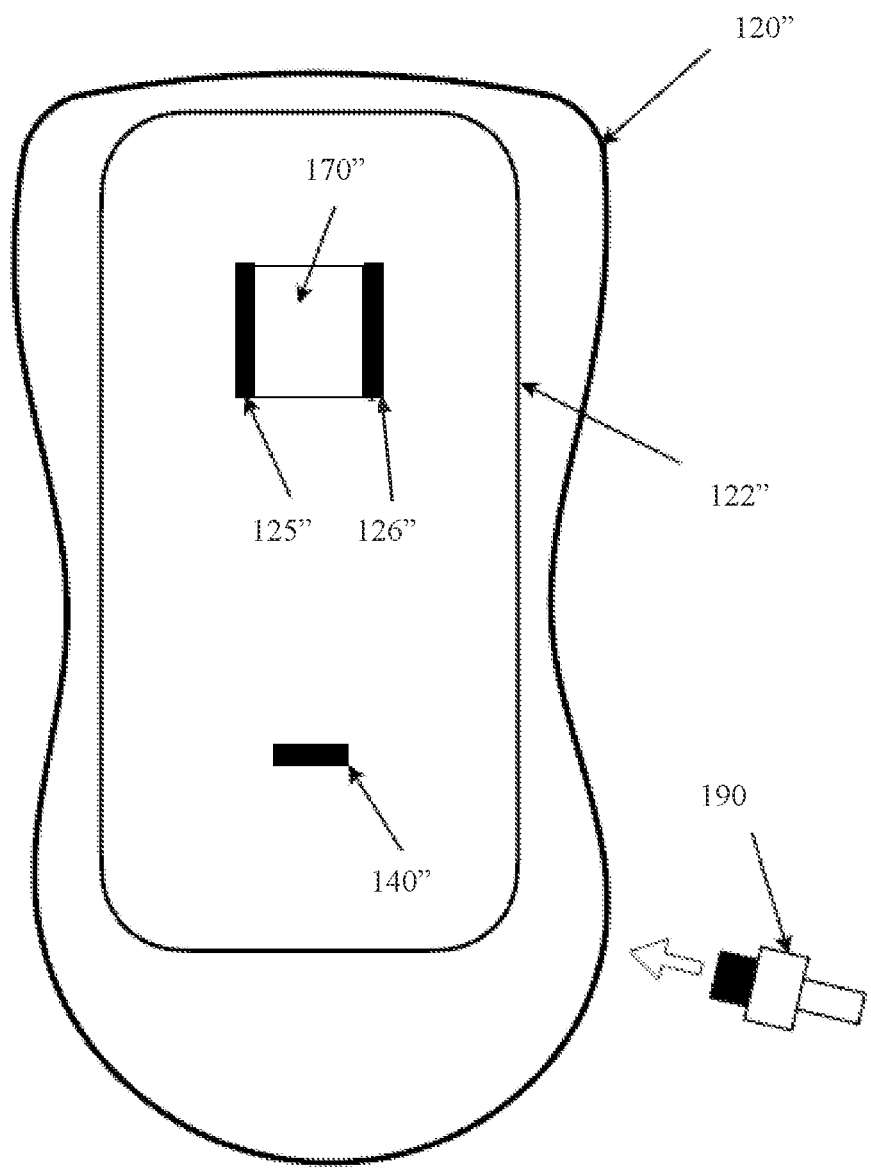
FIG. 10 is a schematic top view illustration of the embodiment of FIG. 9.

FIG. 10 illustrates the base 120" of the adaptor 100", as seen from the top. A groove or holder 122", a charging connector 140", a window 170", and a pair of mirrors 125" and 126" are shown. Holder 122" fits and holds the underside of an optical or laser mouse (not shown). Charging connector 140" plugs into the charging port of the mouse, thus holding it stable and allowing it to be charged from base 120". Window 170" aligns with the optical system of the mouse and exposes the surface under base 120" to that optical system. Mirror pair 125"/126" may include a mirror on each side of window 170". A charging cable 190 can be plugged into a charging port 180" (not shown here) on the side of base 120" in order to charge the mouse.

Figure 11:
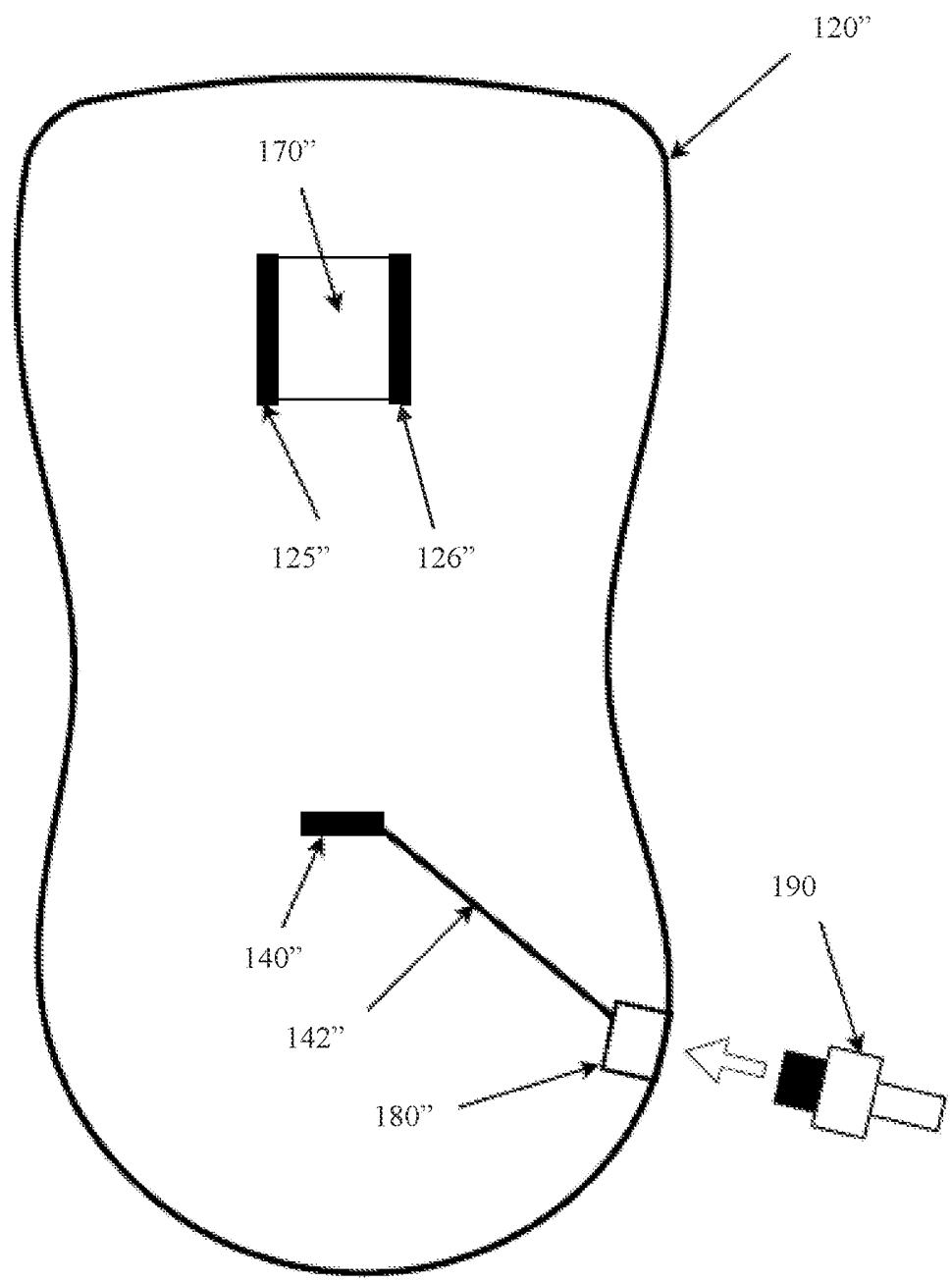
FIG. 11 is a schematic internal view illustration of the embodiment of FIG. 9.

FIG. 11 illustrates a cross-sectional view of the inside of the base 120", as seen from above. Window 170", mirror pair 125"/126", charging connector 140", an electrical connection 142", and charging port 180" are shown. Window 170" aligns with the optical system of an optical or laser mouse (not shown here). Mirror pair 125"/126" may include a mirror on each side of window 170". Charging connector 140" connects to the mouse and is connected to the electrical connection 142" which runs to charging port 180", which may be positioned on the side of base 120". A charging cable 190 can be plugged into charging port 180" in order to charge the mouse.

Figure 12:
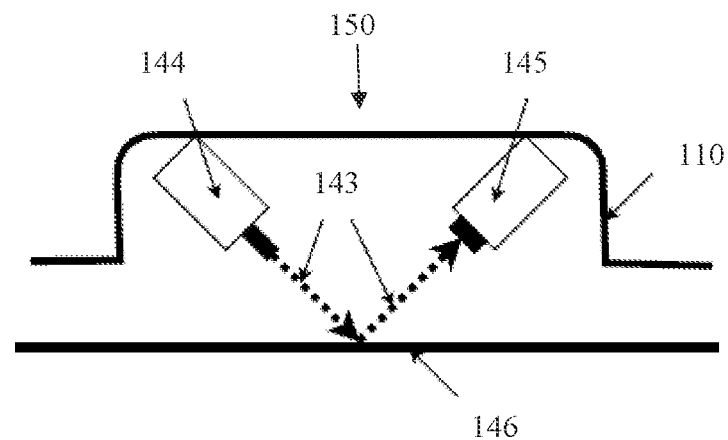
FIG. 12 is a schematic internal view illustration of a portion of a computer mouse for use with the computer mouse adaptor of FIG. 9.

FIG. 12 illustrates a cross-sectional view of the inside of the optical system 150 of a mouse 110, shown without the adaptor 100" of the present invention. The underside of a mouse 110 is shown. The optical system 150 of mouse 110 includes a light source 144 and a light sensor 145. Light source 144 emits a light beam 143 which may be a laser light, LED light, or other type of light as discussed above. Light beam 143 hits a surface 146, and a part of it gets reflected into light sensor 145. Mouse 110 uses the images captured by light sensor 145 to calculate the direction of movement of the mouse 110 to guide a pointer on a computer display as would be appreciated by those skilled in the art.

Figure 13:
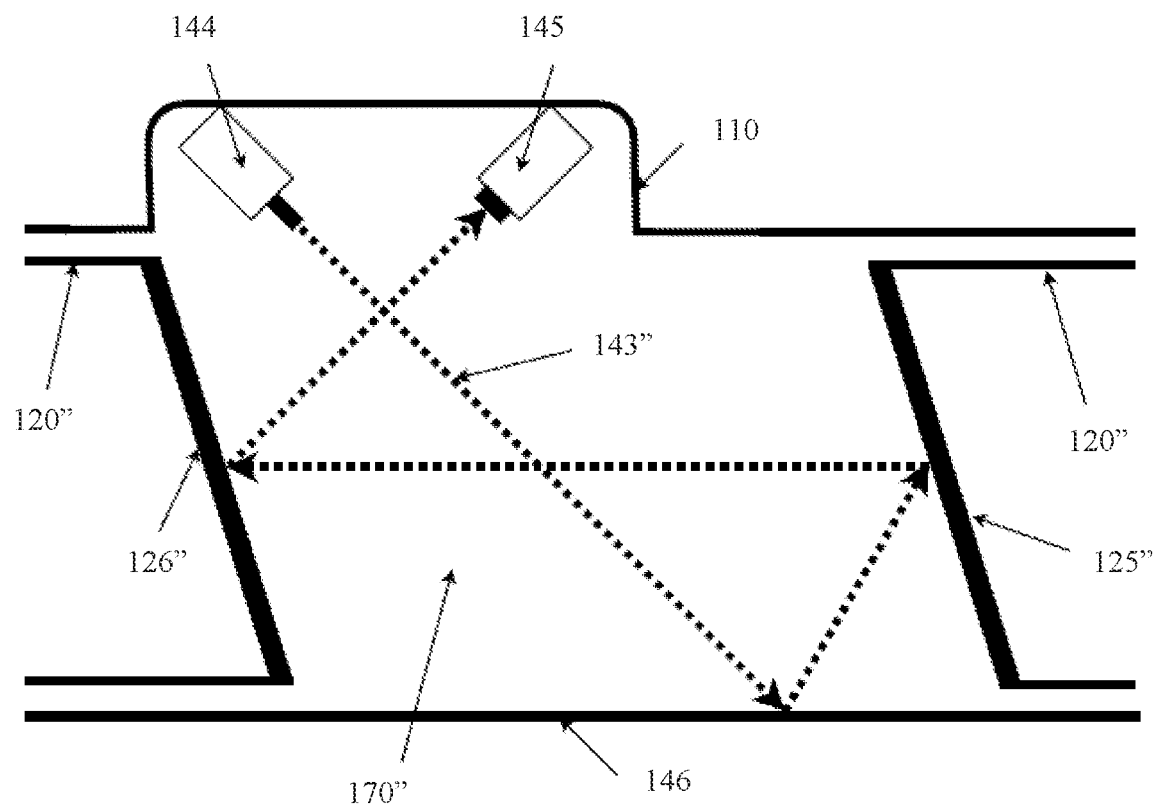
FIG. 13 is a schematic internal view illustration of the computer mouse of FIG. 12 being used with the computer mouse adaptor of FIG. 9.

FIG. 13 illustrates a cross-sectional view of the inside of the optical system 150 of the mouse 110 in combination with the adaptor 100", as seen from the back. The underside of the mouse 110 is shown. The optical system 150 of the mouse 110 includes the light source 144 and a light sensor 145. The base 120" attaches to the bottom of mouse 110 which includes a window 170" and exposes a surface 146 to mouse 110. A mirror 125" and a mirror 126" are positioned on the sides of window 170". Light source 144 emits a light beam 143" which may be a laser light, LED light, or other type of light. Light beam 143" hits surface 146, a part of which gets reflected into mirror 125", which gets reflected into mirror 126", which gets reflected into light sensor 145. Mouse 110 uses the images captured by light sensor 145 to calculate the direction that it is moving.

Mirror 125 and mirror 126" may be angled or parabolic, so as to properly direct light beam 143", and to ensure light sensor 145 has an unobstructed line of view. In various implementations, mirror 125 and mirror 126" may be parallel, such that light beam 143" is directed to enter light sensor 145 at the same angle it would have entered had the mouse 110 been directly lying flat on surface 146 (e.g., as seen in FIG. 12). Base 120" may be constructed such that the bottom of mouse 110 is angled relative to surface 146, and the mirror 125" should, starting from its recommended position parallel to mirror 126", be rotated around the same axis of rotation that the mouse 110 is angled in, but in the opposite direction, and at half the angle. This allows light beam 143" to enter light sensor 145 at the same angle is would have entered had mouse 110 been directly lying flat on surface 146.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items. Thus, the scope of the invention should be determined by the appended claims and their legal equivalents, and not by the examples given.

The invention claimed is:

1. A computer mouse adaptor to hold a computer mouse, the computer mouse including an optical system, having a light source and a light sensor, to detect relative movement over a surface, the computer mouse adaptor comprising:
    an angled base to hold the computer mouse thereon at a position angle relative to the surface so that a bottom of the computer mouse is non-parallel with the surface during operation of the computer mouse thereon;
    wherein the angled base includes an optical device to interface with the optical system of the computer mouse and allow the computer mouse to provide its functionality while being held by the angled base; and
    wherein the optical device comprises first and second opposing non-parallel mirrors aligned to reflect light, from the light source via the surface, to the light sensor while the computer mouse is held by the angled base.

2. The computer mouse adaptor according to claim 1, wherein the second opposing non-parallel mirror is positioned at a reflection angle relative to the first opposing non-parallel mirror that is based upon the position angle of the angled base to the surface.

3. The computer mouse adaptor according to claim 2, wherein the reflection angle is half the position angle but in an opposite direction.

4. A computer mouse adaptor to hold a computer mouse, the computer mouse including a charging interface, and an optical system having a light source and a light sensor to detect relative movement over a surface, the computer mouse adaptor comprising:
    an angled base to hold the computer mouse thereon at a position angle relative to the surface so that a bottom of the computer mouse is non-parallel with the surface during operation of the computer mouse thereon;
    wherein the angled base includes first and second opposing non-parallel mirrors aligned to reflect light, from the light source via the surface, to the light sensor while the computer mouse is held by the angled base to allow the computer mouse to provide its functionality while being held by the angled base; and wherein the angled base further includes a charging system to pair the charging interface of the computer mouse to a power source.

5. The computer mouse adaptor according to claim 4, wherein the second opposing non-parallel mirror is positioned at a reflection angle relative to the first opposing non-parallel mirror that is based upon the position angle of the angled base to the surface.

6. The computer mouse adaptor according to claim 5, wherein the reflection angle is half the position angle but in an opposite direction.

7. The computer mouse adaptor according to claim 4, wherein the charging system of the base comprises:

a charging connector on a top surface of the base to connect to the charging port of the computer mouse; and a base charging port on the base, coupled to the charging connector, for connection to the power source.

8. The computer mouse adaptor according to claim 4, wherein the charging interface of the mouse is a wireless charging interface; and wherein the charging system comprises a wireless charging system.

* * * * *

UNITED STATES PATENT AND TRADEMARK OFFICE
CERTIFICATE OF CORRECTION

| | | |
|---|---|---|
| PATENT NO. | : 11,307,680 B2 | Page 1 of 1 |
| APPLICATION NO. | : 17/173820 | |
| DATED | : April 19, 2022 | |
| INVENTOR(S) | : Peter Tesler | |

It is certified that error appears in the above-identified patent and that said Letters Patent is hereby corrected as shown below:

On the Title Page

Item (12) "Tesier" should read --Tesler--

Item (72) Inventor is listed as Peter Tesier
The correct spelling of inventor's name is Peter Tesler Signed and Sealed this
Fifth Day of July, 2022

Katherine Kelly Vidal
*Director of the United States Patent and Trademark Office*